J. COLLINS.
SAW-GUIDES FOR CIRCULAR SAW-MILLS.
No. 173,907. Patented Feb. 22, 1876.
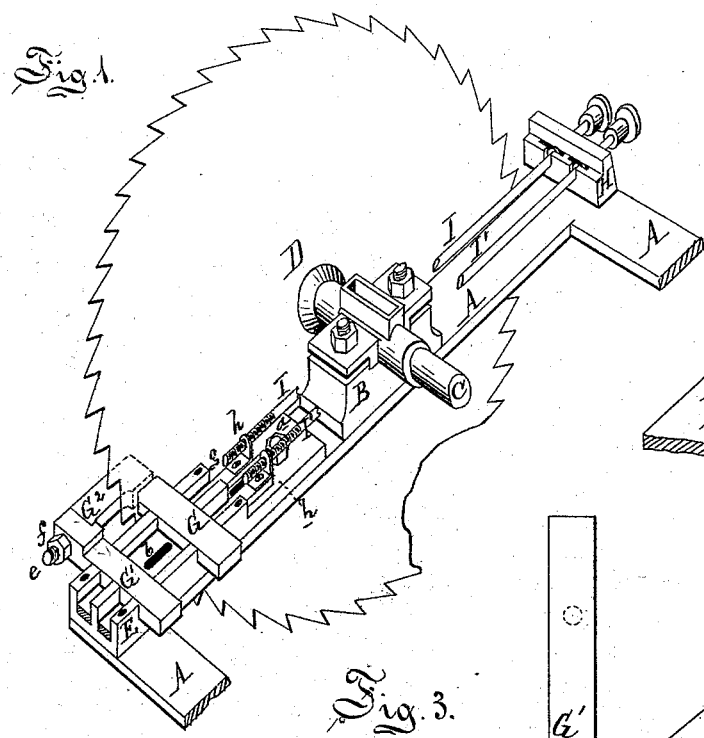
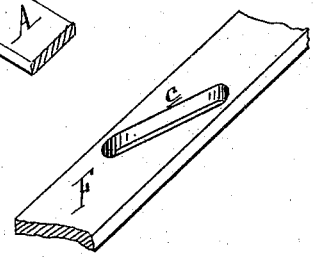
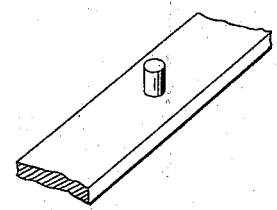
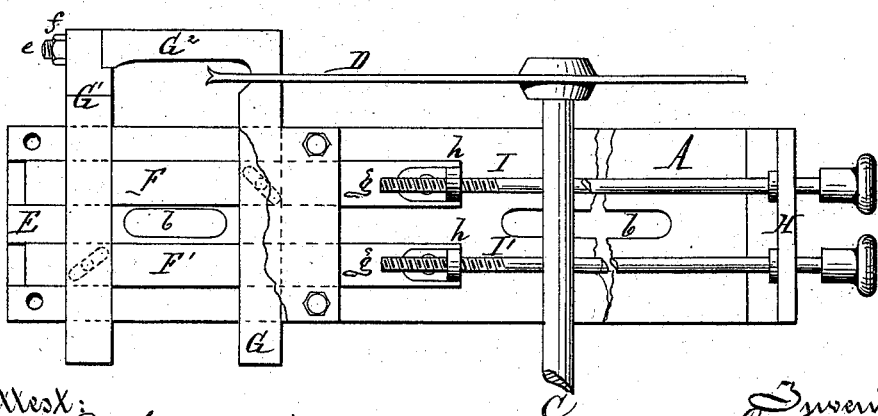
Attest:
Edward Barthel.
Theo. L. Day
Inventor:
J. Collins
By Atty
Thos. L. Sprague

UNITED STATES PATENT OFFICE.

JEREMIAH COLLINS, OF LINCOLN, ASSIGNOR TO WILLIAM M. FERRY, OF GRAND HAVEN, MICHIGAN.

IMPROVEMENT IN SAW-GUIDES FOR CIRCULAR-SAW MILLS.

Specification forming part of Letters Patent No. 173,907, dated February 22, 1876; application filed August 27, 1875.

*To all whom it may concern:*

Be it known that I, JEREMIAH COLLINS, of Lincoln, in the county of Mason and State of Michigan, have invented an Improvement in Saw-Guides for Circular-Saw Mills, of which the following is a specification:

The object of my invention is to render it unnecessary for the sawyer to place himself near the cutting-edge of the saw to adjust the guides, but to enable him to adjust them while the saw is running, without leaving his post, thereby doing away with the most prolific source of accidents in and about circular-saw mills.

The invention consists, first, in giving the saw-guides a longitudinal adjustment by means of a bar under and at a right angle with each, having a longitudinal adjustment through a screw-rod leading toward the position of the sawyer, by means of a pin projecting from the under side of each guide into a diagonal slot in each bar; and, secondly, in making the outer guide in two parts, so that the outer arm (which embraces the saw) may be detached when the saw is to be taken off the arbor.

Figure 1 is a perspective view showing a portion of the saw-frame of a circular saw mill fitted with my improved guides, the cover of the guide-frame being removed. Fig. 2 is an enlarged plan of the guides and their adjusting devices. Fig. 3 is a plan of the outer guide with its parts separated. Fig. 4 is a partial plan of a slide, showing the diagonal slot. Fig. 5 is a perspective view, showing the pin on the under side of a guide.

In the drawing, A represents a portion of the saw-frame of a circular-saw mill. B is one of the boxes through which is journaled the arbor C, carrying the saw D. E is a guide-frame, cast with two longitudinal ways or recesses, and is adjustably secured to the side of the saw-frame near the cutting-periphery of the saw, by means of bolts $a$, through slots $b$ in its bed-plate. In the ways of the guide-frame are laid two sliding bars, F F', each having a diagonal slot, $c$, cut in it. G G$^1$ are the saw-guides laid in slots across the ways of the frame E, resting on the bars F F'; in the under side of each guide is inserted a pin, $d$, which projects into the slot $c$ of the bar below. The bar F, when moved longitudinally, actuates the guide G in the direction of its length, that is to say, across the bar F; in like manner the bar F' actuates the guide G$^1$. The guide G is straight, and its outer end impinges upon and guides the inner face of the saw near the cutting-periphery; the body of the guide G$^1$ is straight until it extends past the cutting-edge of the saw, where it has joined to it an arm, G$^2$, at a right angle therewith, by means of a screw-shank, $e$, on the latter, passing through a slot in the former, and is secured by a screw-nut, $f$, by removing which the said arm G$^2$ can be detached, preparatory to the removal of the saw from its arbor. At the rear end of the saw-frame, on the saw side thereof, if that be, as is usually the case, the sawyer's post, a bracket, H, is erected, through which two rods, I I', are journaled, each having a hand-wheel by which to axially rotate it; on the forward part of each rod a screw-thread, $g$, is cut, and it is tapped through a flange-nut, $h$, bolted to the rear end of the slide-bar in front of it. It will then be seen that the sawyer can, by turning the screw-rods I I', adjust either guide to or from the saw, while in motion, without leaving his post and with perfect safety.

It is well known to all conversant with the manufacture of lumber by circular-saw mills that the great majority of accidents and loss of life and limb in such mills occur to sawyers while adjusting the saw-guides, they having heretofore been compelled to make such adjustments while close to the cutting-edge of the running saw; it will therefore be seen that my means for adjusting the guides are so far removed from the saw as to preclude possibility of accidents from that cause.

What I claim as my invention is—

1. The combination, with the longitudinally and transversely slotted bed-plate, of the guides, and the bars for adjusting the latter in the direction of their length through the pins and diagonal slots, substantially as described.

2. The combination, with the bars for adjusting the guides, of the screw-rods for operating them at a distance from the cutting-edge of the saw, substantially as described.

3. The outer guide, made in two parts, G$^1$ G$^2$, as described, for the purpose specified.

JEREMIAH COLLINS.

Witnesses:
JOSEPH P. SUTHERLAND,
W. H. EASTMAN.